March 24, 1953 A. E. SCHUBERT 2,632,545
DOUBLE SHEET STOP FOR PHOTOGRAPHIC COPYING APPARATUS
Filed Oct. 25, 1949
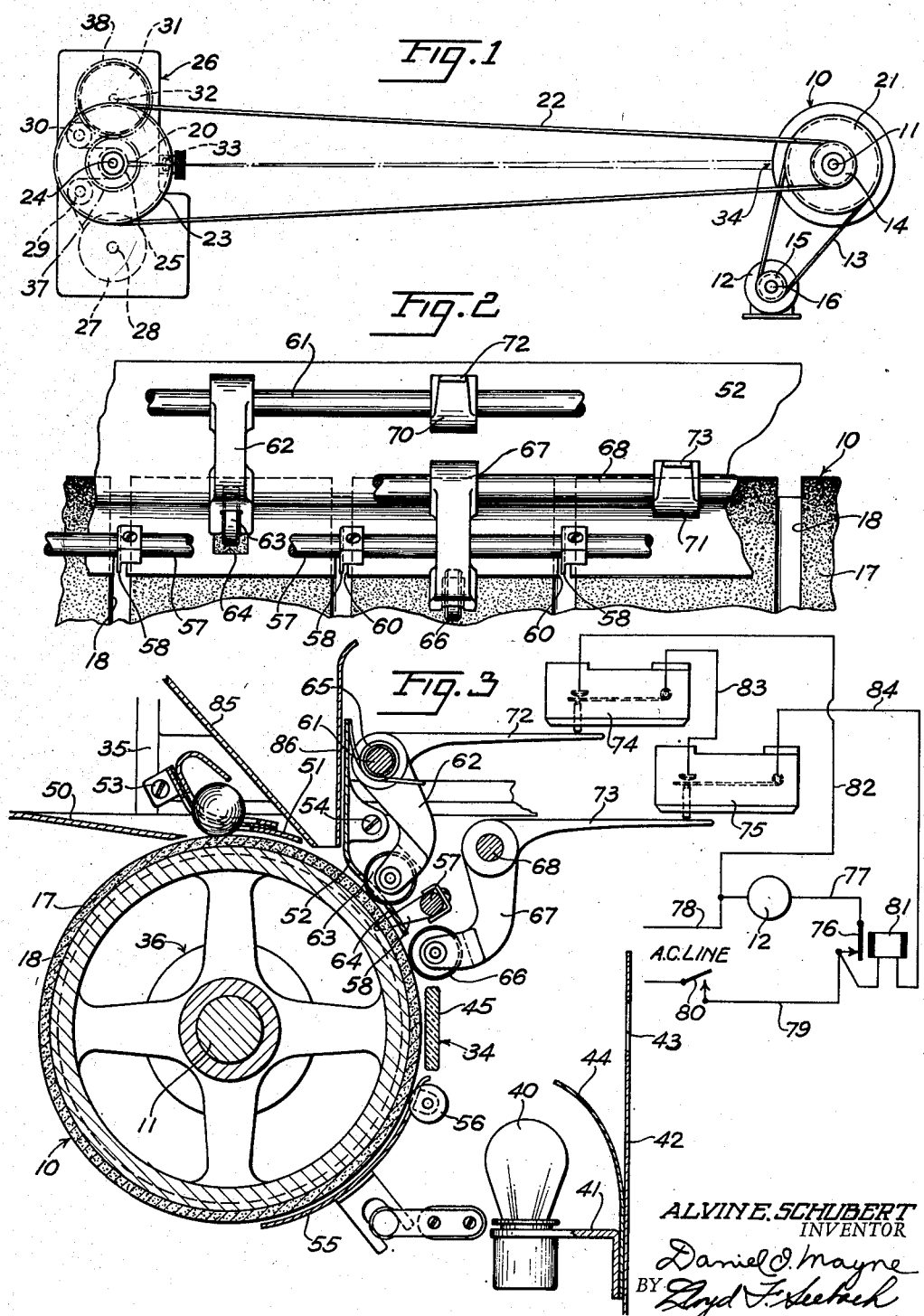
ALVIN E. SCHUBERT
INVENTOR
BY Daniel O. Mayne
Lloyd F. Seebach
ATTORNEY & AGENT Patented Mar. 24, 1953

2,632,545

UNITED STATES PATENT OFFICE 2,632,545

DOUBLE SHEET STOP FOR PHOTOGRAPHIC COPYING APPARATUS

Alvin E. Schubert, Rochester, N. Y., assignor to Eastman Kodak Company, Rochester, N. Y., a corporation of New Jersey Application October 25, 1949, Serial No. 123,412

12 Claims. (Cl. 192—127)

This invention relates to photographic copying apparatus and more particularly to a double sheet stop arrangement which renders the document or sheet feeding means inoperative when two or more documents are simultaneously under two spaced document actuated members.

In photographic copying of documents, checks or the like, it is necessary to provide means for preventing the feeding of two or more documents into the photographing field at the same time. The use of a roller which contacts the surface of the document feeding means and which is raised therefrom to actuate a switch to render the feeding means inoperative when two or more documents are moved thereunder is well known. Such a double sheet stop is disclosed in by U. S. Patent No. 2,196,741, issued April 9, 1940. However, with a single contact double sheet stop there is always the possibility that folded edges and injured or frayed spots, which have become thickened by folds, will stop the feeding means provided such parts of the document are in line with the roller.

To overcome this possibility of frequently and unnecessarily rendering the feeding means inoperative, two measuring or contacting rollers are used which are displaced from each other in the direction of document movement and also transversely of the document path. The rollers are operatively connected to actuating members for switches in the motor circuit, both of which must be actuated to a closed position before the feeding means is rendered inoperative. The advantage of having two rollers displaced in the direction of document movement and transversely of the feed surface is that such an arrangement practically eliminates the possibility of frayed or folded edges and injured spots of a document from operating the double sheet stop inasmuch as two such areas would have to become aligned under each of the two rollers at precisely the same instant. Further, by utilizing the straightening roller as one of the actuating rollers, this roller simultaneously serves a dual purpose, and by locating the second roller between the straightening roller and the photographing aperture, the feeding means is rendered inoperative by multiple documents before said documents enter said aperture.

The primary object of the invention, therefore, is to provide improved means for rendering the feeding means of photographic copying apparatus inoperative before two or more documents simultaneously enter the photographing aperture.

Another object of the invention is to provide a photographic copying apparatus with a double sheet stop for rendering the feeding means inoperative only when two switches are simultaneously maintained in a closed position by the movement to an actuating position of two rollers displaced in the direction of document movement and transversely of the document path.

Yet, another object of the invention is to provide a photographic copying apparatus with a double sheet stop which cannot be actuated to arrest the feeding means by the movement of a folded edge of said document under either of a set of displaced rollers.

And still another object of the invention is to provide a photographic copying apparatus with a double sheet stop in which one of the document actuated rollers is displaced in the direction of document movement and transversely of the document path from the document straightening roller and cooperates therewith to maintain a pair of switches in a closed position to render the feeding means inoperative when two or more documents are simultaneously under each roller.

Other objects and advantages will be apparent to those skilled in the art by the description which follows.

The objects of the invention are embodied in a photographic copying apparatus comprising a feeding means, including a motor, for moving documents along a rectilinear path; a normally closed switch means in series circuit with the motor; a member positioned along the document path for engaging a document moved thereunder; a second member positioned beyond said first-mentioned member in the direction of document movement for engaging a document moved thereunder; an actuating member operatively connected to each of said members and movable thereby into actuating positions when two or more documents are moved thereunder; and electrical means in parallel circuit with said motor and switch means and operative by said actuating members when simultaneously in the actuating positions for opening said normally closed switch means to render said feeding means inoperative.

Reference is now made to the accompanying drawing wherein like reference numerals designate like parts, and wherein:

Fig. 1 is a schematic side elevation of a photographic copying apparatus:

Fig. 2 is a partial front elevation showing the rollers displaced in the direction of document movement and transversely of the document path and the actuating members operatively connected thereto; and Fig. 3 is a vertical section through the apparatus showing the relative positions of the rollers with respect to the direction of document movement and the photographic station, and in which the documents are advanced by means of a rotating drum.

Similar to other document recording apparatus, the apparatus disclosed includes a feeding station, a photographic field or station, an exposure position, a feeding means for moving documents through the photographic field, an advancing means for moving a light-sensitive material through the exposure position, and a clutch means between the feeding means and the advancing means. A clutch means, similar to that disclosed in U. S. Patent No. 1,976,346, issued to C. J. Hughey on October 9, 1934, may be used.

The feeding means which is preferred is similar to that disclosed in U. S. Patent No. 1,957,889, issued to Roy S. Hopkins et al. on May 8, 1934. In the present disclosure the document is moved by means of a continuously rotating drum into and out of the photographic field; however, it is to be understood that the invention is equally applicable to a feeding means which moves the document or sheet either horizontally or vertically into and out of a predetermined station. In the preferred embodiment of the invention, the feeding means comprises a drum 10 which is mounted on shaft 11 and which is driven by the motor 12 through chain or belt 13 encircling sprockets or pulleys 14 and 15 on shaft 11 and motor shaft 16, respectively. Drum 10 is provided with an outer layer 17 of material having a high coefficient of friction, such as cork, and with a plurality of spaced circumferential grooves 18, as shown in Fig. 2.

The advancing means, see Fig. 1, for moving the light-sensitive material continuously through an exposure position 20 comprises a sprocket 21 fixed to shaft 11 and connected by an endless chain 22 to sprocket 23 on shaft 24 which, in turn, may be connected in any suitable manner to film drive roller 25 within the film unit 26. Film unit 26 is preferably of the type disclosed in the aforementioned Hopkins patent and includes a supply reel 27 mounted on spindle 28, a pair of guide rollers 29 and 30, and a take-up reel 31 mounted on spindle 32. The film path in such a film unit is from the supply reel 27 around guide roller 29, around film roller 25, around guide roller 30 and to the take-up reel 31. An objective member 33 is mounted in the front wall of film unit 26 and has optical characteristics corresponding to the distance between the photographic field, as designated by numeral 34, and the exposure position 20 on roller 25. The limiting rays through the objective for the photographic field and exposure station are indicated by broken lines in Fig. 1.

The feed drum 10 is mounted between side frames 35, only one of which is shown in Fig. 3, and the drive from motor 12 is transmitted through a clutch means, designated broadly by the numeral 36, on shaft 11, as disclosed in the above-mentioned Hughey patent. The clutch arrangement accomplishes the connection between the feeding means and the advancing means so that sprocket 21, sprocket 23, roller 25 and take-up reel 31 are rotated. The ratio between sprockets 21 and 23 and gears 37 and 38, which connect the take-up spindle 32 with the film drive roller shaft 24, may be readily determined so that the light-sensitive material is advanced in synchronism with the movement of the document through the photographic field.

The illuminating means comprises a bank of lamps 40 which are in two groups and connected in parallel circuit. Lamps 40 are mounted in line and parallel to the axis of drum 10 on bracket 41 secured to partition 42 which is provided with an aperture 43. A reflector 44 is mounted on partition 42 for reflecting as much of the stray light as possible toward the photographic field 34, at which station the document is moved under glass plate 45.

The feeding station comprises a plate 50, as shown in Fig. 3, which is mounted between frame members 35 and upon which a long document, or sheet, may be moved forward into engagement with drum 10. Small documents, such as checks, may be fed into or placed in the V-shaped throat formed by plates 85 and 86 for delivery to drum 10. The document is guided to the photographic field by the formed plates 51 and 52 which are secured to the frame members 35 at 53 and 54, respectively. Plate 55, in which a plurality of spaced rollers 56 are rotatably mounted, guides the document from the photographic field to a suitable receptacle.

The document straightening means comprises a plurality of fingers and a rotatable member which cooperate with drum 10 to properly orient a document which is fed onto the drum in other than a properly oriented position. Fixedly mounted on shaft 57 which is journalled in members 35 are a plurality of fingers 58 which normally ride in circumferential grooves 18. Fingers 58 are axially spaced along drum 10 and are adapted to be displaced from grooves 18 by a document passing thereunder. The shaft 57 is provided with biasing springs, not shown, which serve to hold fingers 58 yieldably in grooves 18. As shown in Figs. 2 and 3, it will be noted that fingers 58 extend through slots 60 in plate 52 and are positioned above the photographic field to contact the forward edge of a document before it enters the photographic field. A shaft 61 which is journalled in members 35 has a bracket 62 fixedly mounted thereon, said bracket rotatably supporting a metal roller 63 which extends through an aperture 64 in plate 52 and contacts drum 10. The roller 63 is biased into contact with drum 10 by coil spring 65 encircling shaft 61, as shown in Fig. 2, is rotated by the drum, and functions to engage the surface of a document to press it into contact with said drum. It will be noted that the roller 63 is located ahead of fingers 58, i. e., between said fingers and the feeding station, and is positioned axially near the center of drum 10. If a document which is not properly oriented is fed onto drum 10, the leading corner will come to rest against fingers 58 but will not be driven forward with sufficient force to displace the fingers 58. The document then tends to pivot about this corner until the leading edge engages roller 63 which further pivots the document until the entire front edge presses against fingers 58. The increased pressure then displaces fingers 58 from their grooves and the document is moved in a properly oriented position toward the photographing station.

Between fingers 58 and plate 45, a second roller 66 is rotatably mounted in bracket 67 which, in turn, is secured to shaft 68 journalled in the members 35. From Figs. 2 and 3 it will be noted that roller 66 is spaced from roller 63 in the direction of document movement and is also spaced transversely of the document path from roller 63. The shaft 68 is also biased by a spring, not shown, to maintain the roller 66 in contact with drum 10.

Actuating members 70 and 71 are secured to shafts 61 and 68, respectively, and are each provided with an extending arm 72 and 73, said arms being rotatable in a counter-clockwise direction by shafts 61 and 68 as a document is moved under rollers 63 and 66. The arms 72 and 73 normally engage the triggers of normally open switches 74 and 75, respectively, see Fig. 3.

The motor 12 has a normally closed switch 76 in series circuit therewith in line 77 which is connected across the lines 78 and 79, line 79 being provided with a start switch 80. Switches 74 and 75 and solenoid 81 are also arranged in series circuit by lines 82, 83 and 84 and in parallel circuit across the lines 78 and 79 with motor 12 and switch 76 to provide a control for the motor. When a document is fed toward the photographic field, the roller 63 is moved away from the drum by the thickness of the document. This movement rocks shaft 61 and arm 72, but the movement transmitted to arm 72 is not sufficient to close switch 74. In a like manner, a single document will not move arm 73 a sufficient amount to close switch 75. When two or more documents are fed together, the roller 63 is removed a sufficient amount from the drum so that arm 72 closes switch 74 and holds it in its closed position as long as the documents are thereunder. Likewise, roller 66 is moved a sufficient amount by multiple documents to have arm 73 close switch 75. When switches 74 and 75 are simultaneously held in their closed positions, the series circuit, through lines 82, 83 and 84, is closed and the solenoid 81 is energized to open switch 76 and thereby break the motor circuit to render the motor and, hence, the feeding means inoperative.

If a document having a torn or folded edge, or an injured spot where several thicknesses of the document have rolled up, is fed so that the area is aligned with either roller 63 or 66, the solenoid 81 will not be energized since only switch 74 or 75 will be actuated to a closed position. In order to render the feeding means inoperative by closing both switches, the folds will have to be aligned with each roller and spaced from each other by the same distance as the rollers, or a single fold will have to extend across the document and be of a length greater than the transverse distance between the rollers and will have to be folded back a distance greater than the distance between the rollers in the direction of document movement. Such a fold, however, would cover a portion of the document and in such a case the feeding means should be stopped to insure photographing the entire document. It can be readily appreciated, therefore, that normal tears and rolls or folds in the document will not render the feeding means inoperative.

It is not intended that the invention be limited to the apparatus described inasmuch as, in view of the disclosure, other modifications and uses, other than in connection with photographic apparatus, will readily suggest themselves to those skilled in the art without departing from the spirit of the invention or the scope of the appended claims.

Having now particularly described my invention, what I desire to secure by Letters Patent of the United States and what I claim is:

1. In apparatus for directing discrete documents to an operating position, the combination with a feeding means including a motor for moving said documents along a rectilinear path, and a normally closed switch means in series circuit with said motor, of a member positioned along said document path for engaging a document moved thereunder, a second member positioned beyond said first-mentioned member in the direction of document movement for engaging a document moved thereunder, an actuating member operatively connected to each of said members and movable thereby into an actuating position when two or more documents are simultaneously under said members, and electrical means in parallel circuit with said motor and switch means and operative by said actuating members in said actuating position for opening said normally closed switch means to render said feeding means inoperative.

2. In apparatus for directing discrete documents to an operating position, the combination with a feeding means including a motor for moving said documents along a rectilinear path, and a normally closed switch means in series circuit with said motor, of a member positioned along said document path for engaging a document moved thereunder, a second member positioned to one side of and beyond said first-mentioned member in the direction of document movement for engaging a document moved thereunder, an actuating member operatively connected to each of said members and movable thereby into actuating positions when two or more documents are moved thereunder, and electrical means in parallel circuit with said motor and switch means and operative by said actuating members when simultaneously in said actuating positions for opening said normally closed switch means to render said feeding means inoperative.

3. In apparatus for directing discrete documents to an operating position, the combination with a feeding means including a motor for moving said documents along a rectilinear path, and a normally closed switch means in series circuit with said motor, of a member positioned along said document path for engaging a document moved thereunder, a second member positioned to one side of and beyond said first-mentioned member in the direction of document movement for engaging a document moved thereunder, an actuating member operatively connected to each of said members and movable thereby into actuating positions when two or more documents are moved thereunder, and an electrical circuit in parallel circuit with said motor and switch means including two normally-open switches and a relay in series circuit, said normally open switches being actuated to the closed position by said actuating members when simultaneously in said actuating positions for energizing said relay to open said normally closed switch so that said feeding means is rendered inoperative.

4. In apparatus for photographically copying documents, the combination with a feeding means including a motor for moving discrete documents along a rectilinear path, a normally closed switch means in series circuit with said motor, and a document straightening means including a pair of fingers in perpendicular spaced relation to the document path and biased to extend thereinto and a member ahead of and between said fingers in the direction of document movement for engaging and orienting a document so that the leading edge thereof simultaneously engages said fingers, of a second member positioned beyond said fingers in the direction of document movement for engaging a document moved thereunder, an actuating member operatively connected to each of said members and movable thereby into an actuating position when two or more documents are simultaneously under said members, and electrical means in parallel circuit with said motor and switch means and operative by said actuating members in said actuating position for opening said normally closed switch means to render said feeding means inoperative.

5. In apparatus for photographically copying documents, the combination with a feeding means including a motor for moving discrete documents along a rectilinear path, a normally closed switch means in series circuit with said motor, and a document straightening means including a pair of fingers in perpendicular spaced relation to the document path and biased to extend thereinto and a member ahead of and between said fingers in the direction of document movement for engaging and orienting a document so that the leading edge thereof simultaneously engages said fingers, of a second member positioned to one side of said first-mentioned member and beyond said fingers in the direction of document movement for engaging a document moved thereunder, actuating members operatively connected to each of said members and movable thereby into actuating positions when two or more documents are moved thereunder, and electrical means in parallel circuit with said motor and switch means and operative by said actuating members when simultaneously in said actuating positions for opening said normally closed switch means to render said feeding means inoperative.

6. In apparatus for photographically copying documents, the combination with a feeding means including a motor for moving discrete documents along a rectilinear path and through a photographing station, a normally closed switch means in series circuit with said motor, and a document straightening means including a pair of fingers in perpendicular spaced relation to the document path and biased to extend thereinto and a pivotally mounted member ahead of and between said fingers in the direction of document movement for engaging and orienting a document so that the leading edge thereof simultaneously engages said fingers, of a second pivotally mounted member positioned to one side of said first-mentioned member and between said fingers and photographic station for engaging a document moved thereunder, actuating members operatively connected to each of said members and movable thereby into actuating positions when two or more documents are moved thereunder, and an electrical circuit in parallel circuit with said motor and switch means including two normally open switches and a relay in series circuit, said normally open switches being actuated to the closed position by said actuating members when simultaneously in said actuating positions for energizing said relay to open said normally closed switch means so that said feeding means is rendered inoperative.

7. In apparatus for directing discrete documents to an operating position, the combination with a rotatable drum, and a drive means including a motor and a normally closed switch means in series circuit and operatively connected to said drum for continuously rotating the same, of a member axially positioned near the center of said drum for engaging a document moved thereunder, a second member positioned beyond said first-mentioned member in the direction of document movement for engaging a document moved thereunder, an actuating member operatively connected to each of said members and movable thereby into an actuating position when two or more documents are simultaneously under said members, and electrical means in parallel circuit with said motor and switch means and operative by said actuating members in said actuating position for opening said normally closed switch means to render said driving means inoperative.

8. In apparatus for directing discrete documents to an operating position, the combination with a rotatable drum, and a drive means including a motor and a normally closed switch means in series circuit and operatively connected to said drum for continuously rotating the same, of a member axially positioned near the center of said drum for engaging a document moved thereunder, a second member axially positioned to one side of and beyond said first-mentioned member in the direction of document movement for engaging a document moved thereunder, an actuating member operatively connected to each of said members and movable thereby into actuating positions when two or more documents are moved thereunder, and electrical means in parallel circuit with said motor and switch means and operative by said actuating members when simultaneously in said actuating positions for opening said normally closed switch means to render said drive means inoperative.

9. In apparatus for directing discrete documents to an operating position, the combination with a rotatable drum, and a drive means including a motor and a normally closed switch means in series circuit and operatively connected to said drum for continuously rotating the same, of a member axially positioned near the center of said drum for engaging a document moved thereunder, a second member axially positioned to one side of and beyond said first-mentioned member in the direction of document movement for engaging a document moved thereunder, an actuating member operatively connected to each of said members and movable thereby into actuating positions when two or more documents are moved thereunder, and an electrical circuit in parallel circuit with said motor and switch means including two normally open switches and a relay in series circuit, said normally open switches being actuated to the closed position by said actuating members when simultaneously in said actuating positions for energizing said relay to open said normally closed switch so that said drive means is rendered inoperative.

10. In apparatus for photographically copying documents, the combination with a rotatable drum for feeding discrete documents, a drive means including a motor and a normally closed switch means in series circuit and operatively connected to said drum for continuously rotating the same, and a document straightening means including a pair of fingers spaced axially of said drum and biased into engagement therewith and yieldingly displaceable therefrom and a member axially positioned near the center of said drum and ahead of and between said fingers in the direction of document movement for engaging and orienting a document so that the leading edge thereof simultaneously engages said fingers, of a second member positioned beyond said fingers in the direction of document movement for engaging a document moved thereunder, an actuating member operatively connected to each of said members and movable thereby into an actuating position when two or more documents are simultaneously under said members, and electrical means in parallel circuit with said motor and switch means and operative by said actuating members in said actuating position for opening said normally closed switch means to render said drive means inoperative.

11. In apparatus for photographically copying documents, the combination with a rotatable drum for feeding discrete documents, a drive means including a motor and a normally closed switch means in series circuit and operatively connected to said drum for continuously rotating the same, and a document straightening means including a pair of fingers spaced axially of said drum and biased into engagement therewith and yieldingly displaceable therefrom and a member axially positioned near the center of said drum and ahead of and between said fingers in the direction of document movement for engaging and orienting a document so that the leading edge thereof simultaneously engages said fingers, of a second member axially positioned to one side of said first-mentioned member and beyond said fingers in the direction of document movement for engaging a document thereunder, actuating members operatively connected to each of said members and movable thereby into actuating positions when two or more documents are moved thereunder, and electrical means in parallel circuit with said motor and switch means and operative by said actuating members when simultaneously in said actuating positions for opening said normally closed switch means to render said drive means inoperative.

12. In apparatus for photographically copying documents, the combination with a rotatable drum for feeding discrete documents, a drive means including a motor and a normally closed switch means in series circuit and operatively connected to said drum for continuously rotating the same, and a document straightening means including a pair of fingers spaced axially of said drum and biased into engagement therewith and yieldingly displaceable therefrom and a member axially positioned near the center of said drum and ahead of and between said fingers in the direction of document movement for engaging and orienting a document so that the leading edge thereof simultaneously engages said fingers, of a second member axially positioned to one side of said first-mentioned member and beyond said fingers in the direction of document movement for engaging a document thereunder, actuating members operatively connected to each of said members and movable thereby into actuating positions when two or more documents are moved thereunder, and an electrical circuit in parallel circuit with said motor and switch means including two normally open switch means and a relay in series circuit, said normally open switch means being actuated to the closed position by said actuating members when simultaneously in said actuating positions for energizing said relay to open said normally closed switch means so that said drive means is rendered inoperative.

ALVIN E. SCHUBERT.

REFERENCES CITED

The following references are of record in the file of this patent:

UNITED STATES PATENTS

| Number | Name | Date |
| --- | --- | --- |
| 1,701,861 | Niblack | Feb. 12, 1929 |
| 2,145,574 | Rimberg | Jan. 31, 1939 |
| 2,318,132 | Welk | May 4, 1943 |

FOREIGN PATENTS

| Number | Country | Date |
| --- | --- | --- |
| 475,601 | Great Britain | Nov. 23, 1937 |